(12) United States Patent
Shan et al.

(10) Patent No.: US 11,516,852 B2
(45) Date of Patent: Nov. 29, 2022

(54) RANDOM ACCESS METHOD OF COMMUNICATIONS APPARATUS, APPARATUS, AND STORAGE MEDIUM

(71) Applicant: HUAWEI TECHNOLOGIES CO., LTD., Guangdong (CN)

(72) Inventors: Baokun Shan, Beijing (CN); Hong Wang, Beijing (CN); Odile Rollinger, Cambridge (GB); Brian Alexander Martin, Berkshire (GB)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/869,407

(22) Filed: May 7, 2020

(65) Prior Publication Data
US 2020/0329505 A1 Oct. 15, 2020

Related U.S. Application Data

(63) Continuation of application No. PCT/CN2017/110285, filed on Nov. 9, 2017.

(51) Int. Cl.
*H04W 74/08* (2009.01)
*H04W 72/04* (2009.01)

(52) U.S. Cl.
CPC ... *H04W 74/0833* (2013.01); *H04W 72/0486* (2013.01)

(58) Field of Classification Search
CPC . H04W 52/146; H04W 52/244; H04W 52/34; H04W 52/50; H04W 74/04;
(Continued)

(56) References Cited

U.S. PATENT DOCUMENTS 10,397,833 B2 * 8/2019 Lee .................. H04W 60/04
2016/0302235 A1 10/2016 Hwang et al.
(Continued)

FOREIGN PATENT DOCUMENTS

CN 104521302 A 4/2015
CN 105009663 A 10/2015
(Continued)

OTHER PUBLICATIONS

3GPP TS 36.133 V15.0.0 (Sep. 2017), "3rd Generation Partnership Project; Technical Specification Group Radio Access Network; Evolved Universal Terrestrial Radio Access (E-UTRA); Requirements for support of radio resource management (Release 15)," Sep. 2017, 2663 pages.

(Continued)

*Primary Examiner* — Liton Miah
(74) *Attorney, Agent, or Firm* — Fish & Richardson P.C.

(57) ABSTRACT

Embodiments of this application provide a method, the method includes: sending, by the RRC entity, a first RRC message to a lower-layer entity, and receiving, by the MAC entity, a first RRC message from an upper-layer entity, where the first RRC message includes to-be-transmitted data; determining, by the MAC entity, a first random access preamble if a data amount supported by a coverage level of the communications apparatus meets a size of the first RRC message, where the first random access preamble is used to indicate that the first RRC message is to be sent in a random access process.

20 Claims, 6 Drawing Sheets

(58) Field of Classification Search
CPC . H04W 74/08; H04W 74/0833; H04W 76/15; H04W 84/045; H04W 72/0486
See application file for complete search history.

(56) References Cited

U.S. PATENT DOCUMENTS

| | | | |
|---|---|---|---|
| 2019/0037447 A1* | 1/2019 | Lee | H04W 74/004 |
| 2019/0350037 A1* | 11/2019 | Lee | H04W 76/18 |
| 2020/0187245 A1* | 6/2020 | Fujishiro | H04W 74/0833 |

FOREIGN PATENT DOCUMENTS

| | | | |
|---|---|---|---|
| EP | 3032870 A1 | 6/2016 | |
| WO | 2013120458 A1 | 8/2013 | |
| WO | 2016153025 A1 | 9/2016 | |

OTHER PUBLICATIONS

QUALCOMM Incorporated, "Email discussion report: [99#45][NB-1OT/MTC] Early data transmission," 3GPP Draft; R2-1710888, Oct. 8, 2017, 42 pages.

3GPP TS 36.321 V14.4.0 (Sep. 2017), "3rd Generation Partnership Project; Technical Specification Group Radio Access Network; Evolved Universal Terrestrial Radio Access (E-UTRA); Medium Access Control (MAC) protocol specification (Release 14)," Sep. 2017, 108 pages.

Huawei, "Early Data transmission in CP solution," 3GPP Draft; R3-172720, Aug. 21, 2017, 3 pages.

3GPP TS 36.331 V12.15.1 (Sep. 2017),3rd Generation Partnership Project;Technical Specification Group Radio Access Network;Evolved Universal Terrestrial Radio Access (E-UTRA);Radio Resource Control (RRC);Protocol specification (Release 12), total 459 pages.

Ericsson, "Report from Rel-15 MTC session," 3GPP Draft; R2-1711836, Oct. 13, 2017, 12 pages.

Extended European Search Report issued in European Application No. 17931245.9 dated Jul. 29, 2020, 10 pages.

PCT International Search Report and Written Opinion issued in International Application No. PCT/CN2017/110285 dated Jun. 28, 2018, 15 pages (with English translation).

Office Action issued in Chinese Application No. 201780096428.2 dated Jun. 24, 2021, 9 pages.

Office Action issued in Indian Application No. 202037019624 dated Jul. 30, 2021, 6 pages.

Ericsson, "Early data transmission for MTC," 3GPP TSG-RAN WG1 Meeting #90bis, R1-1716996, Prague, Czech Republic, Oct. 9-13, 2017, 4 pages.

Ericsson, "Early Data Transmission over NAS," 3GPP TSG-RAN WG2 #99bis, R2-1710521, Prague, Czech Republic, Oct. 9-13, 2017, 6 pages.

Office Action issued in Japanese Application No. 2020-525864 dated Apr. 27, 2021, 9 pages (with English translation).

3GPP TS 36.300 V14.4.0 (Sep. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Sep. 2017, 329 pages.

* cited by examiner

RANDOM ACCESS METHOD OF COMMUNICATIONS APPARATUS, APPARATUS, AND STORAGE MEDIUM

CROSS-REFERENCE TO RELATED APPLICATIONS

This application is a continuation of International Patent Application No. PCT/CN2017/110285, filed on Nov. 9, 2017, the disclosure of which is hereby incorporated by reference in its entirety.

TECHNICAL FIELD

This application relates to communications technologies, and in particular, to a random access method of a communications apparatus, an apparatus, and a storage medium.

BACKGROUND

Mobile communications have greatly changed people's lives, but the pursuit of mobile systems with higher performance has never stopped. For example, the 4th generation (4G) mobile communications system and the 5th generation (5G) mobile communications system emerge to cope with future explosive growth of mobile data traffic, massive device connections, and continuously emerging various new services and application scenarios. The internet of things is a constituent part of 5G, and a market demand for the IoT is growing rapidly.

Currently, the 3rd generation partnership project (3GPP) standard has proposed a solution for a feature of the internet of things based on a cellular network, for example, based on a cellular narrowband internet of things (NB-IoT) network or a cellular machine type communications (MTC) network. The NB-IoT network and the MTC network each use a feature of a narrowband technology to carry an IoT service. The NB-IoT network uses a new air interface technology independent of existing cellular network long term evolution (LTE), has lower terminal costs, and supports a lower rate and lower mobility. The MTC network is a part of a conventional cellular network, has terminal costs slightly higher than that of the NB-IoT, and is applicable to an internet of things service with a higher rate and higher mobility.

In a Rel-15 version, the NB-IoT and the MTC are continuously optimized for a feature of small data packet transmission of the internet of things, and a new technology for data transmission in a random access process is being designed, to reduce a latency and power consumption of small data packet transmission. However, this new design also brings new challenges. For example, in conventional random access for a purpose of only establishing a radio resource control (RRC) connection, inter-layer interaction between an RRC layer and a media access control (MAC) layer is relatively simple, and usually occurs only in an initial phase and an end phase (including an abnormal exit) of the random access. However, if data needs to be transmitted in a random access process, a rollback mechanism may be involved due to a network resource shortage or an air interface transmission failure. In this case, interaction between the RRC layer and the MAC layer may be more complex.

Therefore, a new random access solution needs to be designed for the NB-IoT and the MTC, to meet a new requirement of data transmission in the random access process.

SUMMARY

This application provides a random access method of a communications apparatus, an apparatus, and a storage medium, to design a new random access solution for NB-IoT and MTC, to meet a new requirement of data transmission in a random access process.

A first aspect of this application provides a random access method of a communications apparatus. The communications apparatus includes a MAC entity, and the method includes:

receiving, by the MAC entity, a first RRC message from an upper-layer entity, where the first RRC message includes to-be-transmitted data; and determining, by the MAC entity, a first random access preamble if a data amount supported by a coverage level of the communications apparatus meets a size of the first RRC message, where the first random access preamble is used to indicate that the first RRC message is to be sent in a random access process.

In other words, the first random access preamble may be used to notify a receive end that data other than signaling is to be transmitted in the current random access process. It may be understood that a function of the first random access preamble may be expressed in a plurality of manners. For example, the first random access preamble may be used to indicate that an RRC message carrying the to-be-transmitted data is to be sent in the random access process. For another example, the first random access preamble may be used to indicate that the to-be-transmitted data is to be sent in the random access process. For another example, the first random access preamble may be used to indicate that the to-be-transmitted data is to be sent by using an RRC message in the random access process. For another example, the first random access preamble may be used to indicate that the to-be-transmitted data is to be sent in MSG3 in the random access process. For another example, the first random access preamble may be used to indicate that the to-be-transmitted data is to be sent by using a message in the random access process. An expression manner of the function of the first random access preamble is not limited in this application.

In addition, the first random access preamble and an existing random access preamble may use different resources, so that the receive end can distinguish between the first random access preamble and the existing random access preamble by using the resources used by the preambles. A resource dimension includes a time domain (a period, duration, a start time, and the like of a resource for sending a preamble), a frequency domain (a carrier, a subcarrier, and the like used to send a preamble), a code domain (a code word used by a preamble), and the like. A difference between resources may be a difference in any one or more of a time domain, a frequency domain, and a code domain. This is not limited in this application. The MAC entity may obtain, in a plurality of manners, resources that can be used by the first random access preamble and the existing random access preamble, for example, obtain a related configuration from the upper-layer entity. This is also not limited. Based on a solution in which the first random access preamble and the existing random access preamble use different resources, the foregoing method may be expressed as follows:

receiving, by the MAC entity, a first RRC message from an upper-layer entity, where the first RRC message includes to-be-transmitted data; and if a data amount supported by a coverage level of the communications apparatus meets a size of the first RRC message, determining, by the MAC entity, a resource occupied by a first random access preamble, where the resource occupied by the first random access preamble is used to indicate that the first RRC message is to be sent in a random access process. An expression of a function of the resource occupied by the first random access preamble may be similar to the foregoing expression of the function of the first random access preamble. Details are not described herein again.

The MAC entity determines whether the data amount supported by the coverage level meets the size of the first RRC message, so that information that needs to be exchanged between the MAC entity and another entity (for example, an RRC entity) can be reduced.

Optionally, the method further includes:

receiving, by the MAC entity from a lower-layer entity, a response message that is in response to the first random access preamble, where the response message includes a resource allocated to the communications apparatus; and sending, by the MAC entity, the first RRC message to the lower-layer entity if the resource meets the size of the first RRC message.

Optionally, the method further includes:

sending, by the MAC entity, first indication information to the upper-layer entity if the data amount supported by the coverage level of the communications apparatus does not meet the size of the first RRC message, where the first indication information is used to indicate that the first RRC message cannot be sent in the random access process.

In the foregoing several solutions, it should be understood that the MAC entity needs to determine whether the data amount supported by the coverage level of the communications apparatus meets the size of the first RRC message. When the size of the first RRC message is less than or equal to the data amount supported by the coverage level, the data amount supported by the coverage level meets the size of the first RRC message; or when the size of the first RRC message is greater than the data amount supported by the coverage level, the data amount supported by the coverage level does not meet the size of the first RRC message.

The MAC entity may obtain, in a plurality of manners, the data amount supported by the coverage level of the communications apparatus. For example, the MAC entity may obtain configuration information of the communications apparatus or configuration information of a network from the upper-layer entity. This is not limited in this solution.

A main purpose of the first indication information is to notify the RRC entity that a determining result of the MAC entity is that data cannot be transmitted in the random access process. It may be understood that a function of the first indication information may be expressed in a plurality of manners. For example, the first indication information may be used to indicate that the first RRC message cannot be sent in the random access process. For another example, the first indication information may be used to indicate that the data amount supported by the current coverage level does not meet the size of the first RRC message. For another example, the first indication information may be used to indicate that the first RRC message cannot be transmitted. For another example, the first indication information may be used to indicate that an RRC message that does not include data is needed. For another example, the first indication information may be used to indicate that an early data transmission procedure is not to be performed in the current random access process, or that data cannot be transmitted in the current random access process. This is not limited in this application.

Optionally, the method further includes:

sending, by the MAC entity, second indication information to the upper-layer entity if the resource does not meet the size of the first RRC message, where the second indication information is used to indicate that the first RRC message cannot be sent in the random access process.

Similarly, a purpose of the second indication information is also to indicate that the resource is found insufficient to transmit the first RRC message in a transmission process. It may be understood that a function of the second indication information may be expressed in a plurality of manners. For example, the second indication information may be used to indicate that an uplink resource is insufficient to transmit the first RRC message. For another example, the second indication information may be used to indicate that a second RRC message that does not include the to-be-transmitted data is to be obtained. For another example, the second indication information may be used to indicate that the first RRC message fails to be transmitted. For another example, the second indication information may be used to indicate that data cannot be transmitted in the current random access process. This is not limited in this application.

Optionally, the method further includes:

receiving, by the MAC entity, a second RRC message from the upper-layer entity, where the second RRC message does not include the to-be-sent data; and sending, by the MAC entity, the second RRC message to the lower-layer entity if the data amount supported by the coverage level of the communications apparatus does not meet the size of the first RRC message; or sending, by the MAC entity, the second RRC message to the lower-layer entity if the resource does not meet the size of the first RRC message.

A second aspect of this application provides a random access method of a communications apparatus. The communications apparatus includes an RRC entity, and the method includes:

sending, by the RRC entity, a first RRC message to a lower-layer entity, where the first RRC message includes to-be-transmitted data.

Optionally, the method further includes:

receiving, by the RRC entity, indication information sent by the lower-layer entity, where the indication information is used to indicate that the first RRC message cannot be sent in a random access process.

Optionally, a data amount supported by a coverage level of the communications apparatus does not meet a size of the first RRC message; or a resource allocated to the communications apparatus does not meet a size of the first RRC message.

Optionally, the method further includes:

sending, by the RRC entity, a second RRC message to the lower-layer entity, where the second RRC message does not include the to-be-sent data.

In the foregoing solution, when the data amount supported by the coverage level of the communications apparatus does not meet the size of the first RRC message, the indication message is the first indication information in the first aspect; or when the resource allocated to the communications apparatus does not meet the size of the first RRC message, the indication information is the second indication information in the first aspect. For a specific meaning of the indication information, refer to descriptions in the first aspect.

A third aspect of this application provides a random access method of a communications apparatus. The communications apparatus includes a MAC entity, and the method includes:

receiving, by the MAC entity, first indication information from an upper-layer entity, where the first indication information is used to indicate that to-be-transmitted data is to be transmitted in a random access process; and returning, by the MAC entity, a coverage level of the communications apparatus to the upper-layer entity.

In this solution, a meaning of the first indication information is different from that of the first indication information in the foregoing solution. Herein, a purpose of sending the first indication information to the MAC entity by the RRC entity is to obtain the coverage level. Therefore, in addition to indicating that the to-be-transmitted data is to be transmitted in the random access process, the first indication information may be further used to indicate that the coverage level is to be obtained, or the first indication information may be further used to instruct the MAC entity to return the coverage level to the RRC entity. This is not limited in this application.

Optionally, the method further includes:
receiving, by the MAC entity, a first RRC message from the upper-layer entity, where the first RRC message includes the to-be-transmitted data; and determining, by the MAC entity, a first random access preamble, where the first random access preamble is used to indicate that the first RRC message is to be sent in the random access process.

Optionally, the method further includes:
receiving, by the MAC entity from a lower-layer entity, a response message that is in response to the first random access preamble, where the response message includes a resource allocated to the communications apparatus; and sending, by the MAC entity, the first RRC message to the lower-layer entity if the resource meets a size of the first RRC message.

Optionally, the method further includes:
sending, by the MAC entity, second indication information to the upper-layer entity if the resource does not meet the size of the first RRC message, where the second indication information is used to indicate that the first RRC message cannot be sent in the random access process.

In this solution, a purpose of the second indication information is also to indicate that the resource is found insufficient to transmit the first RRC message in a transmission process. Therefore, the second indication information may be used to indicate that an uplink resource is insufficient to transmit the first RRC message, or indicate that a second RRC message that does not include the to-be-transmitted data is to be obtained, or indicate that the first RRC message fails to be transmitted, or indicate that data cannot be transmitted in the current random access process. This is not limited in this application.

Optionally, the method further includes:
receiving, by the MAC entity, a second RRC message from the upper-layer entity, where the second RRC message does not include the to-be-sent data; and sending, by the MAC entity, the second RRC message to the lower-layer entity.

A fourth aspect of this application provides a random access method of a communications apparatus. The communications apparatus includes an RRC entity, and the method includes:

sending, by the RRC entity, first indication information to a lower-layer entity, where the first indication information is used to indicate that to-be-transmitted data is to be transmitted in a random access process;

receiving, by the RRC entity, a coverage level, of the communications apparatus, returned by the lower-layer entity; and sending, by the RRC entity, a first RRC message to the lower-layer entity if a data amount supported by the coverage level of the communications apparatus meets a size of the first RRC message, where the first RRC message includes the to-be-transmitted data.

Optionally, the method further includes:
receiving, by the RRC entity, second indication information sent by the lower-layer entity, where the second indication information is used to indicate that the first RRC message cannot be sent in the random access process; and sending, by the RRC entity, a second RRC message to the lower-layer entity, where the second RRC message does not include the to-be-sent data.

Optionally, the method further includes:
sending, by the RRC entity, the second RRC message to the lower-layer entity if the data amount supported by the coverage level of the communications apparatus does not meet the size of the first RRC message, where the second RRC message does not include the to-be-sent data.

In each technical solution of the third aspect and the fourth aspect, it should be understood that the RRC entity needs to determine whether the data amount supported by the coverage level of the communications apparatus meets the size of the first RRC message. When the size of the first RRC message is less than or equal to the data amount supported by the coverage level, the data amount supported by the coverage level meets the size of the first RRC message; or when the size of the first RRC message is greater than the data amount supported by the coverage level, the data amount supported by the coverage level does not meet the size of the first RRC message.

In the foregoing solution, meanings of the first indication information and the second indication information are similar to those of the first indication information and the second indication information in the third aspect. Details are not described herein again.

In any solution of the first aspect to the fourth aspect, it should be further understood that the upper-layer entity includes an entity that is located at a layer higher than that of a current entity and that is adjacent to or not adjacent to the current entity. For example, another function entity, such as a radio link control (RLC) entity, may be further included between the RRC entity and the MAC entity.

A fifth aspect of this application provides a MAC entity, and the MAC entity may be configured to implement the method in the first aspect. For example, the MAC entity is configured to:

receive a first RRC message from an upper-layer entity, where the first RRC message includes to-be-transmitted data; and determine a first random access preamble if a data amount supported by a coverage level of the communications apparatus meets a size of the first RRC message, where the first random access preamble is used to indicate that the first RRC message is to be sent in a random access process.

Optionally, the MAC entity is further configured to:
receive, from a lower-layer entity, a response message that is in response to the first random access preamble, where the response message includes a resource allocated to the communications apparatus; and send the first RRC message to the lower-layer entity if the resource meets the size of the first RRC message.

Optionally, the MAC entity is further configured to:

send first indication information to the upper-layer entity if the data amount supported by the coverage level of the communications apparatus does not meet the size of the first RRC message, where the first indication information is used to indicate that the first RRC message cannot be sent in the random access process.

Optionally, the MAC entity is further configured to:

send second indication information to the upper-layer entity if the resource does not meet the size of the first RRC message, where the second indication information is used to indicate that the first RRC message cannot be sent in the random access process.

Optionally, the MAC entity is further configured to:

receive a second RRC message from the upper-layer entity, where the second RRC message does not include the to-be-sent data; and send the second RRC message to the lower-layer entity if the data amount supported by the coverage level of the communications apparatus does not meet the size of the first RRC message; or send the second RRC message to the lower-layer entity if the resource does not meet the size of the first RRC message.

A sixth aspect of this application provides an RRC entity, and the RRC entity may be configured to implement the method in the second aspect. For example, the RRC entity is configured to:

send a first RRC message to a lower-layer entity, where the first RRC message includes to-be-transmitted data.

Optionally, the RRC entity is further configured to:

receive indication information sent by the lower-layer entity, where the indication information is used to indicate that the first RRC message cannot be sent in a random access process.

Optionally, a data amount supported by a coverage level of the communications apparatus does not meet a size of the first RRC message; or a resource allocated to the communications apparatus does not meet a size of the first RRC message.

Optionally, the RRC entity is further configured to:

send a second RRC message to the lower-layer entity, where the second RRC message does not include the to-be-sent data.

A seventh aspect of this application provides a MAC entity, and the MAC entity may be configured to implement the method in the third aspect. For example, the MAC entity is configured to:

receive first indication information from an upper-layer entity, where the first indication information is used to indicate that to-be-transmitted data is to be transmitted in a random access process; and return a coverage level of the communications apparatus to the upper-layer entity.

Optionally, the MAC entity is further configured to:

receive a first RRC message from the upper-layer entity, where the first RRC message includes the to-be-transmitted data; and determine a first random access preamble, where the first random access preamble is used to indicate that the first RRC message is to be sent in the random access process.

Optionally, the MAC entity is further configured to:

receive, from a lower-layer entity, a response message that is in response to the first random access preamble, where the response message includes a resource allocated to the communications apparatus; and send the first RRC message to the lower-layer entity if the resource meets the size of the first RRC message.

Optionally, the MAC entity is further configured to:

send second indication information to the upper-layer entity if the resource does not meet the size of the first RRC message, where the second indication information is used to indicate that the first RRC message cannot be sent in the random access process.

Optionally, the MAC entity is further configured to:

receive a second RRC message from the upper-layer entity, where the second RRC message does not include the to-be-sent data; and send the second RRC message to the lower-layer entity.

An eighth aspect of this application provides an RRC entity, and the RRC entity may be configured to implement the method in the fourth aspect. For example, the RRC entity is configured to:

send first indication information to a lower-layer entity, where the first indication information is used to indicate that to-be-transmitted data is to be transmitted in a random access process;

receive a coverage level, of the communications apparatus, returned by the lower-layer entity; and send a first RRC message to the lower-layer entity if a data amount supported by the coverage level of the communications apparatus meets a size of the first RRC message, where the first RRC message includes the to-be-transmitted data.

Optionally, the RRC entity is further configured to:

receive second indication information sent by the lower-layer entity, where the second indication information is used to indicate that the first RRC message cannot be sent in a random access process; and send a second RRC message to the lower-layer entity, where the second RRC message does not include the to-be-sent data.

Optionally, the RRC entity is further configured to:

send the second RRC message to the lower-layer entity if the data amount supported by the coverage level of the communications apparatus does not meet the size of the first RRC message, where the second RRC message does not include the to-be-sent data.

This application further provides a communications apparatus, including the MAC entity provided in any implementation of the fifth aspect or the seventh aspect.

This application further provides a communications apparatus, including the RRC entity provided in any implementation of the sixth aspect or the eighth aspect.

This application further provides a communications apparatus, including the MAC entity provided in any implementation of the fifth aspect and the RRC entity provided in any implementation of the sixth aspect.

This application further provides a communications apparatus, including the MAC entity provided in any implementation of the seventh aspect and the RRC entity provided in any implementation of the eighth aspect.

A ninth aspect of this application provides a communications apparatus, including a memory configured to store a computer instruction and a processor configured to execute the computer instruction to implement any method in the first aspect to the fourth aspect.

A tenth aspect of this application provides a communications apparatus, including a memory configured to store a computer instruction and a processor configured to execute the computer instruction to implement a function of any entity in the fifth aspect to the eighth aspect.

The communications apparatus may be a terminal, a communications chip, a baseband chip, or a system-on-a-chip chip.

In the communications apparatus according to the ninth aspect or tenth aspect, there is at least one processor, configured to execute an executable instruction, namely, a computer program, stored in the memory.

An eleventh aspect of this application further provides a readable storage medium, including computer instructions, where the computer instructions are used to implement the random access method of a communications apparatus provided in any implementation solution of the first aspect.

A twelfth aspect of this application further provides a readable storage medium, including computer instructions, where the computer instructions are used to implement the random access method of a communications apparatus provided in any implementation solution of the second aspect.

A thirteenth aspect of this application further provides a readable storage medium, including computer instructions, where the computer instructions are used to implement the random access method of a communications apparatus provided in any implementation solution of the third aspect.

A fourteenth aspect of this application further provides a readable storage medium, including computer instruction, where the computer instructions are used to implement the random access method of a communications apparatus provided in any implementation solution of the fourth aspect.

A fifteenth aspect of this application provides a program product, where the program product comprises computer instructions, the computer instructions are stored in a readable storage medium, and at least one processor of a communications device reads the computer instruction from the readable storage medium and executes the computer instruction, to enable the communications device to perform the random access method of a communications apparatus according to any implementation of the first aspect.

A sixteenth aspect of this application provides a program product, where the program product comprises computer instructions, the computer instructions are stored in a readable storage medium, and at least one processor of a communications device reads the computer instruction from the readable storage medium and executes the computer instruction, to enable the communications device to perform the random access method of a communications apparatus according to any implementation of the second aspect.

A seventeenth aspect of this application provides a program product, where the program product comprises computer instructions, the computer instructions are stored in a readable storage medium, and at least one processor of a communications device reads the computer instruction from the readable storage medium and executes the computer instruction, to enable the communications device to perform the random access method of a communications apparatus according to any implementation of the third aspect.

An eighteenth aspect of this application provides a program product, where the program product comprises computer instructions, the computer instructions are stored in a readable storage medium, and at least one processor of a communications device reads the computer instruction from the readable storage medium and executes the computer instruction, to enable the communications device to perform the random access method of a communications apparatus according to any implementation of the fourth aspect.

According to the random access method of a communications apparatus, the apparatus, and the storage medium that are provided in this application, whether the data amount supported by the coverage level of the communications apparatus meets the size of the first RRC message is determined to determine a proper random access preamble, to send the RRC message carrying the to-be-transmitted data in the random access process, thereby implementing early data transmission. In this way, flexible switching is performed between an early data transmission procedure and a conventional random access procedure, thereby helping reduce power consumption of the communications apparatus and a transmission latency. In addition, the MAC entity determines, based on the coverage level, whether to perform data transmission in the random access process, to avoid a plurality of times of signaling exchange with the upper-layer entity, thereby reducing signaling overheads, and improving transmission efficiency. Optionally, the RRC entity obtains the coverage level from the MAC entity, determines whether to perform data transmission in the random access process, and may generate a corresponding RRC message based on a determining result, to avoid a problem that an RRC message that does not meet the data amount supported by the coverage level is generated and an RRC message needs to be generated again in a subsequent process, thereby improving transmission efficiency.

DESCRIPTION OF EMBODIMENTS

Figure 1:
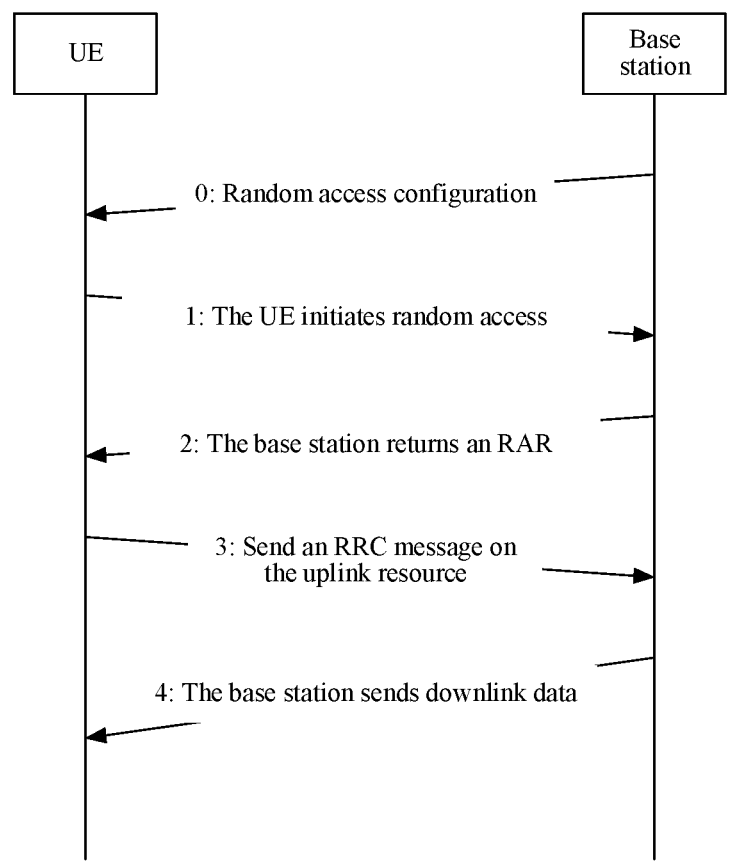
FIG. 1 is a schematic flowchart of data transmission in a random access phase.

FIG. 1 is a schematic flowchart of data transmission in a random access phase. In an NB-IoT system and an MTC system, as shown in FIG. 1, a procedure of data transmission in the random access phase is as follows:

0: A base station performs random access configuration. The base station broadcasts a related configuration of data transmission in the random access process. Data transmission in the random access process may be referred to as early data transmission (EDT). This configuration may be understood as a related configuration of the EDT. The related configuration includes a control threshold (transport block size, TBS) of an uplink data amount, of the EDT, supported by each coverage level.

UE determines, based on a coverage level and an uplink data amount of the UE, whether to perform EDT. If the data amount is greater than a data amount control threshold of the current coverage level, the UE initiates a conventional random access procedure. If the data amount is less than or equal to a data amount control threshold of the current coverage level, the UE initiates an EDT procedure in a next step 1.

1: The UE initiates random access, and indicates, by using a preamble, that early data transmission is to be performed in the current random access process. This means that the UE uses a specific random access resource to initiate the random access, and further indicates that this random access is an EDT procedure.

2: The base station returns a random access response (RAR), which carries an uplink resource. The base station replies with the RAR based on the random access preamble sent by the UE, and adds, to the RAR, a resource (UL grant) used for uplink data transmission. The resource may be not equal to the broadcast TBS in step 0.

3: The UE sends an RRC message on the uplink resource. This means that the UE determines, based on the UL grant in the RAR, whether to add data in a message 3 (MSG3). If the UL grant is insufficient to carry uplink data, the UE sends a conventional RRC connection setup request message, to start to set up an RRC connection. If the UL grant is sufficient to carry uplink data, the UE sends, in the message 3, an RRC message including the data.

4: If downlink data exists, the base station sends the downlink data to the UE. After receiving the message 3 carrying the data, the base station submits the uplink data to a core network. If the core network has downlink data to be sent to the UE, the base station may choose to deliver the downlink data to the UE in a message 4, and enable the UE to enter an idle state after receiving the message 4.

In the conventional random access process, if a radio resource control (RRC) connection is to be set up, an RRC layer of a terminal usually prepares an RRC connection setup request message, and then submits the RRC connection setup request message to a MAC layer for transmission. To transmit the RRC message, the MAC layer initiates random access, transmits the RRC message to the base station in the message 3, and receives a downlink RRC connection setup message in the message 4. If the random access succeeds, the MAC layer notifies the RRC layer and submits the corresponding message to the RRC layer. If the random access fails, for example, if a contention resolution fails or the terminal is temporarily not allowed to access the network due to a load reason, the MAC layer notifies the RRC layer of the random access failure.

The following describes in detail functions of the RRC layer, the MAC layer, and another layer, and an implementation of inter-layer interaction in the EDT procedure.

In this application, it should be understood that a MAC entity and the MAC layer each represent a medium that is in a communications apparatus and that is responsible for controlling and connecting to a physical layer, and an RRC entity, RRC, the RRC layer, an RRC protocol layer, and the like each represent a function entity that is in the communications apparatus and that implements radio resource control. A specific name is not limited in this application. The communications apparatus may be a terminal, UE, or the like, or may be a specific device that includes a communication function, such as a mobile phone, a computer, various sensors, or a communications chip.

Based on the foregoing description, this application provides a random access method of a communications apparatus. The method provides an interaction mode that is between the RRC entity and the MAC entity and that is suitable for an early data transmission procedure.

Figure 2:
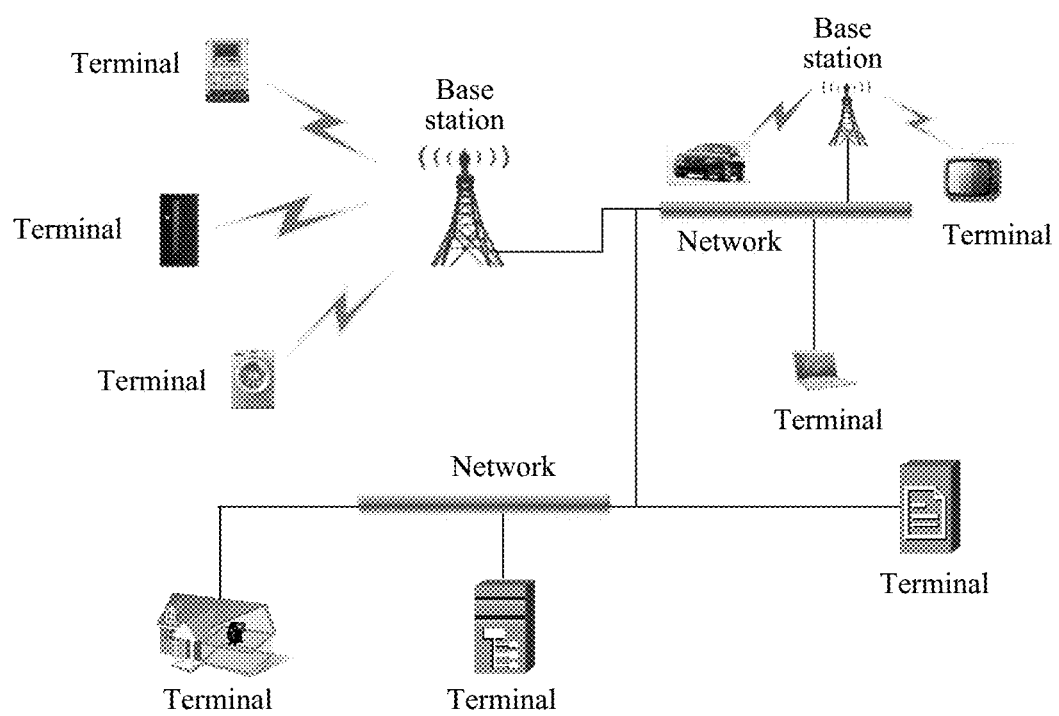
FIG. 2 is a schematic diagram of an application scenario of a random access method of a communications apparatus according to this application.

The solutions provided in this application may be applied to various wireless communications systems such as a 2G system, a 3G communications system, a 4G communications system, a 5G system, and a wireless local area network, and in particular, applied to a wireless communications system with low complexity and low power consumption of a terminal, for example, a narrowband internet of things (NB-IoT) network and an MTC network. FIG. 2 is a schematic diagram of an application scenario of a random access method of a communications apparatus according to this application. As shown in FIG. 2, the scenario includes a network device (for example, a base station), and various types of terminals connected to the network device, and a specific device that includes a communication function, such as a mobile phone, a computer, various sensors, or a communications chip that may be collectively referred to as a communications device. The communications apparatus in this application includes an RRC entity and a MAC entity. The MAC entity and the RRC may be disposed in a distributed manner. This is not limited in this application. In all the embodiments of this application, to-be-transmitted data, to-be-sent data, service data, data, and the like have a same meaning.

Embodiment 1

Figure 3:
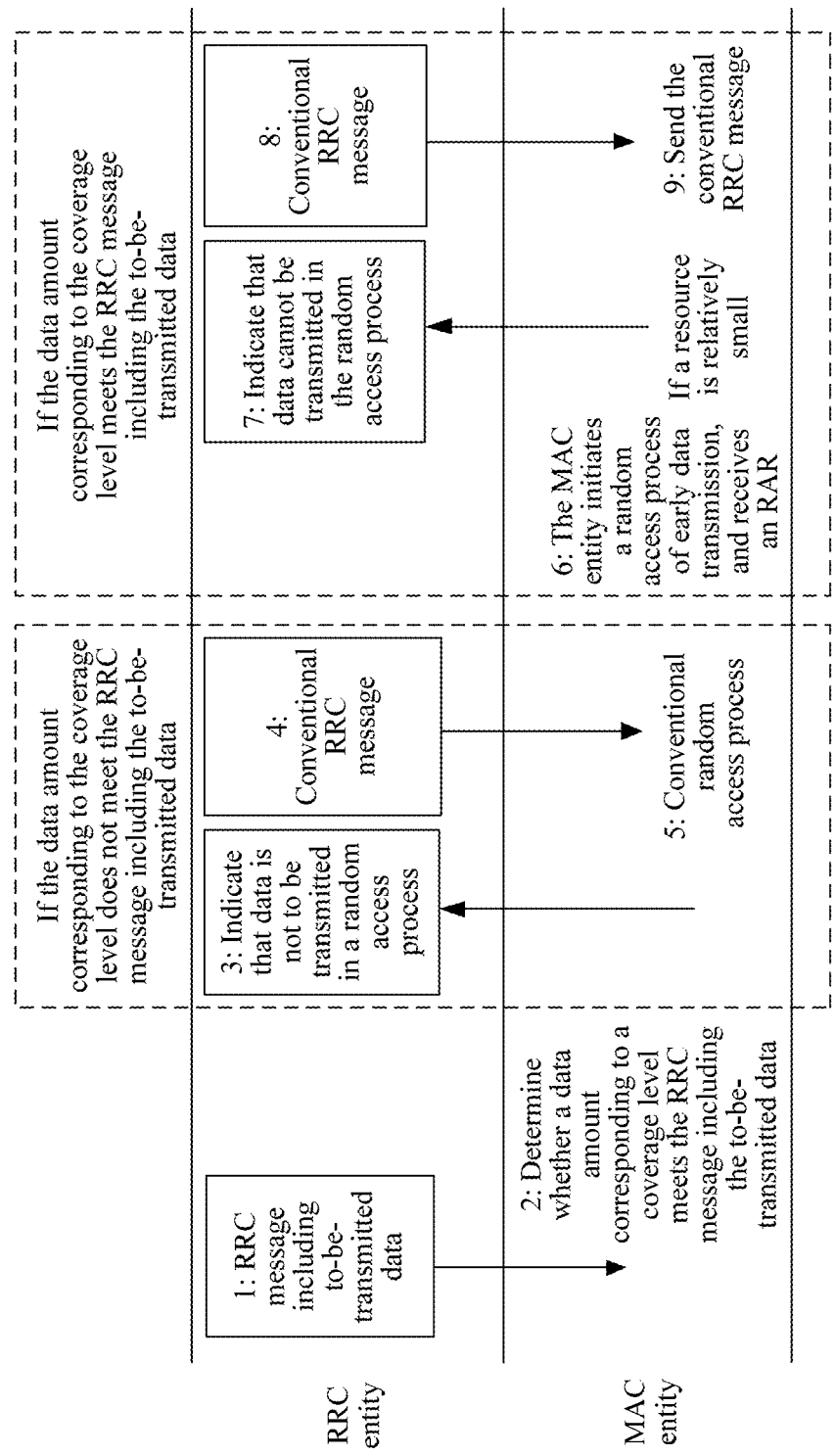
FIG. 3 is a schematic interaction diagram of Embodiment 1 of a random access method of a communications apparatus according to this application.

FIG. 3 is a schematic interaction diagram of Embodiment 1 of a random access method of a communications apparatus according to this application. As shown in FIG. 3, in this solution, an RRC entity generates one RRC message each time, and a MAC entity determines whether to initiate early data transmission (EDT for short) in an initial phase, that is, whether to perform data transmission in a random access process. A specific interaction process of the method is as follows:

Step 1: The RRC entity generates an RRC message including to-be-transmitted data, and sends the RRC message including the to-be-transmitted data to the MAC entity.

In this application, information exchanged between the RRC entity and the MAC entity may be classified into service data and signaling. It should be understood that the to-be-transmitted data is service data that needs to be carried in an RRC message for uploading, and is not RRC signaling. Information exchange between the RRC entity and the MAC entity may also be understood as information transfer or information delivery. This is not limited in this application.

Step 2: When receiving the RRC message that is sent by the RRC entity and that includes the to-be-transmitted data, the MAC entity may determine whether a data amount corresponding to a coverage level meets the RRC message including the to-be-transmitted data.

A specific meaning of this step is: The RRC message including the to-be-transmitted data triggers the random access process, and the MAC entity determines the coverage level of the communications apparatus based on an RSRP obtained through measurement, and determines, based on a data amount control threshold, preconfigured by a base station, corresponding to the coverage level, whether the data amount corresponding to the coverage level of the communications apparatus is sufficient to transmit the RRC message including the to-be-transmitted data. To be specific, the MAC entity determines whether a size of the RRC message including the to-be-transmitted data is greater than the data amount control threshold corresponding to the coverage level. If the size of the RRC message including the to-be-transmitted data is greater than the data amount control threshold corresponding to the coverage level, the data amount corresponding to the coverage level does not meet the RRC message including the to-be-transmitted data, that is, the MAC entity determines not to perform early data transmission, that is, not to transmit data in the current random access process; or if the size of the RRC message including the to-be-transmitted data is smaller than or equal to the data amount control threshold corresponding to the coverage level, the data amount corresponding to the coverage level meets the RRC message including the to-be-transmitted data, that is, the MAC entity determines to perform early data transmission, that is, to transmit data in the current random access process.

The MAC entity determines, based on the coverage level, whether to perform data transmission in the random access process, to avoid a plurality of times of signaling exchange with an upper-layer entity, thereby reducing signaling overheads, and improving transmission efficiency.

Step 3: If a determining result of the MAC entity is that the data amount corresponding to the coverage level does not meet the RRC message including the to-be-transmitted data, the MAC entity returns indication information to the RRC entity, where the indication information is used to indicate that data is not to be transmitted in the random access process.

It may be understood that a main purpose of the indication information is to notify the RRC entity that a determining result of the MAC entity is that data cannot be transmitted in the random access process. It may be understood that a function of the indication information may be expressed in a plurality of manners. For example, the indication information may be used to indicate that the RRC message including the to-be-transmitted data cannot be sent in the random access process. For another example, the indication information may be used to indicate that the data amount supported by the current coverage level does not meet the size of the RRC message including the to-be-transmitted data. For another example, the indication information may be used to indicate that the RRC message including the to-be-transmitted data cannot be transmitted. For another example, the indication information may be used to indicate that an RRC message that does not include data is needed. For another example, the indication information may be used to indicate that an early data transmission procedure is not to be performed in the current random access process, or that data cannot be transmitted in the current random access process. This is not limited in this application.

Step 4: After receiving the indication information indicating that data is not to be transmitted in the random access process, the RRC entity generates an RRC message that does not include the to-be-transmitted data, that is, generates a conventional RRC message, and sends the conventional RRC message to the MAC entity.

Step 5: The MAC entity performs random access based on the conventional RRC message, to be specific, sends a random access preamble, receives a random access response returned by the base station, and sends, on an uplink resource in the random access response, the RRC message that does not include the to-be-transmitted data.

Step 6: If a determining result of the MAC entity is that the data amount corresponding to the coverage level meets the RRC message including the to-be-transmitted data, the MAC entity sends a specific random access preamble to a lower-layer entity, to initiate an early data transmission process.

This solution means that the random access preamble in step 6 is different from the random access preamble in step 5.

In this step, the MAC entity determines the specific random access preamble, and sends the specific random access preamble to the lower-layer entity. The random access preamble indicates that data needs to be transmitted in the current random access process. A specific indication manner is not limited in this application. In this way, when the lower-layer entity interacts with the base station, the base station can determine, by using the random access preamble, that data needs to be transmitted in the current random access, and allocates a resource to the communications device. The MAC entity receives, from the lower-layer entity, the random access response RAR returned by the base station, where the RAR carries the uplink resource. The MAC entity sends, on the uplink resource, the RRC message including the to-be-transmitted data, or selects, from uplink resources allocated by the base station, a proper resource to upload all or some RRC messages including the to-be-transmitted data. That is, the MAC entity sends the RRC message including the to-be-transmitted data in the message 3 shown in FIG. 1.

After step 6, optionally, the MAC entity may further perform determining again based on the resource carried in the RAR, to determine whether the to-be-transmitted data can be transmitted in the random access process. A specific process is shown in the following steps 7 to 9.

Step 7: If the resource is relatively small, the MAC entity sends indication information to the RRC entity, to indicate that data cannot be transmitted in the random access process.

A purpose of the indication information is also to indicate that the resource is found insufficient to transmit a first RRC message, that is, indicate that the configured uplink resource is relatively small. It may be understood that a function of the indication information may be expressed in a plurality of manners. For example, the indication information may be used to indicate that the uplink resource is insufficient to transmit the first RRC message. For another example, the indication information may be used to indicate that a second RRC message that does not include the to-be-transmitted data is to be obtained. For another example, the indication information may be used to indicate that the first RRC message fails to be transmitted. For another example, the indication information may be used to indicate that data cannot be transmitted in the current random access process. This is not limited in this application.

In this solution, when the MAC entity sends the RRC message including the to-be-transmitted data, and finds that the configured uplink resource is insufficient to transmit the RRC message including the to-be-transmitted data, the MAC entity needs to indicate to the RRC entity that the conventional RRC message needs to be sent.

Step 8: After receiving the indication information indicating that data cannot be transmitted in the random access process, the RRC entity generates an RRC message that does not include the to-be-transmitted data, that is, generates a conventional RRC message, and sends the conventional RRC message to the MAC entity.

Step 9: The MAC entity receives the conventional RRC message, and sends, on the uplink resource in the random access response, the conventional RRC message that does not include the to-be-transmitted data. That is, the MAC entity sends the conventional RRC message in the message 3 shown in FIG. 1.

The random access method of a communications apparatus provided in this embodiment provides a solution for interaction between the MAC entity and the RRC entity in the random access process, so that flexible switching may be performed between an early data transmission procedure and a conventional random access procedure. In addition, the early data transmission procedure can be seamlessly rolled back to the conventional random access procedure, the random access preamble does not need to be resent, and the random access response does not need to be received again, thereby reducing signaling overheads, and helping reduce power consumption of the communications apparatus and a transmission latency.

Embodiment 2

Figure 4:
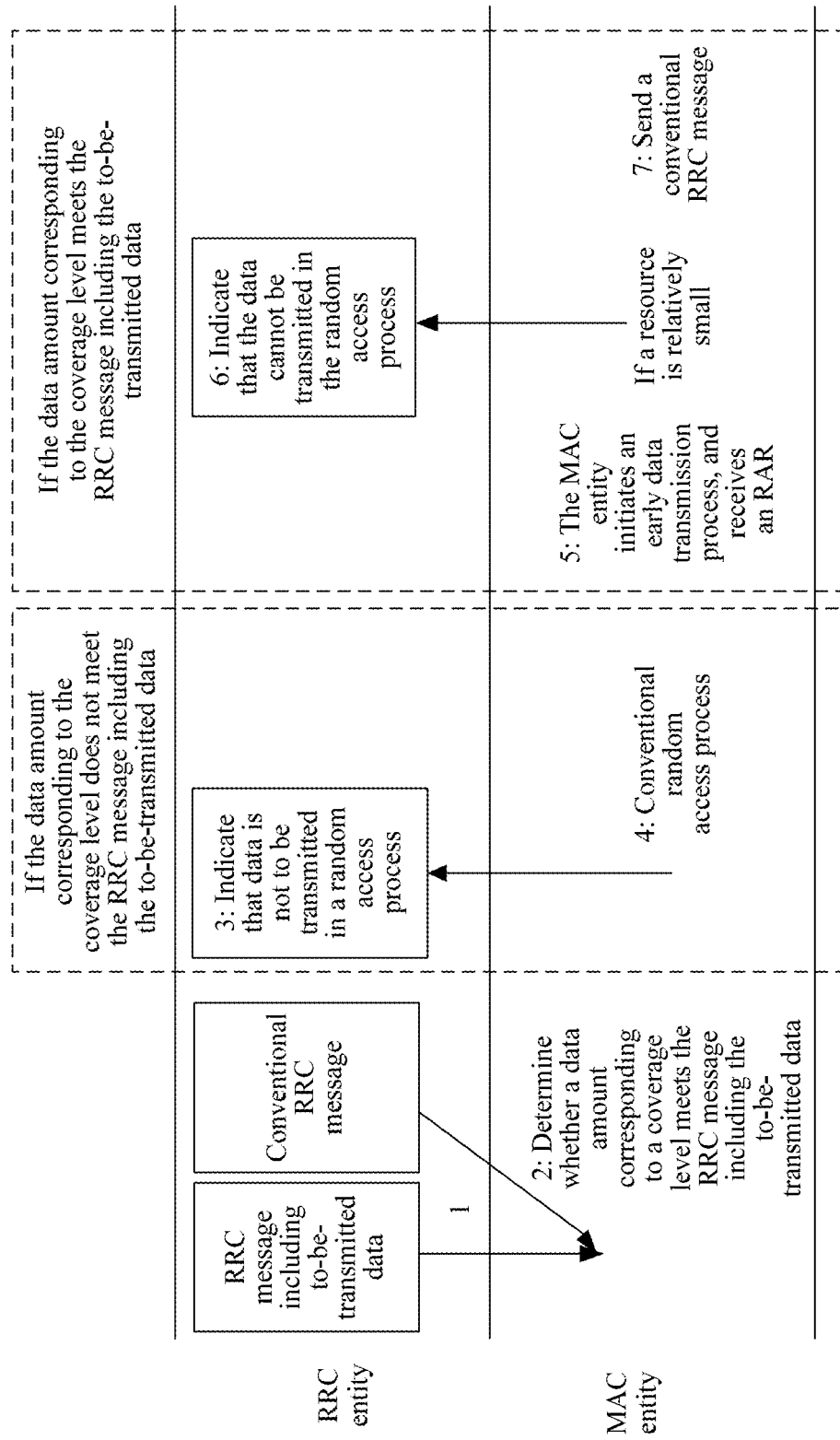
FIG. 4 is a schematic interaction diagram of Embodiment 2 of a random access method of a communications apparatus according to this application.

FIG. 4 is a schematic interaction diagram of Embodiment 2 of a random access method of a communications apparatus according to this application. As shown in FIG. 4, in this solution, an RRC entity simultaneously generates two RRC messages, where one RRC message includes to-be-transmitted data, and the other message does not include the to-be-transmitted data. Whether to perform data transmission in a random access process is determined by a MAC entity. A specific interaction process of the method is as follows:

Step 1: The RRC entity generates an RRC message including the to-be-transmitted data and a conventional RRC message, and simultaneously sends the RRC message including the to-be-transmitted data and the conventional RRC message to the MAC entity.

Step 2: When receiving the RRC message including the to-be-transmitted data and the conventional RRC message that are sent by the RRC entity, the MAC entity may determine whether a data amount corresponding to a coverage level meets the RRC message including the to-be-transmitted data.

A specific meaning of this step is: The MAC entity starts the random access process, determines the coverage level of the communications apparatus based on an RSRP obtained through measurement, and determines, based on a data amount control threshold, preconfigured by a base station, corresponding to the coverage level, whether the data amount corresponding to the coverage level of the communications apparatus is sufficient to transmit the RRC message including the to-be-transmitted data. To be specific, the MAC entity determines whether a size of the RRC message including the to-be-transmitted data is greater than the data amount control threshold corresponding to the coverage level. If the size of the RRC message including the to-be-transmitted data is greater than the data amount control threshold corresponding to the coverage level, the data amount corresponding to the coverage level does not meet the RRC message including the to-be-transmitted data, that is, the MAC entity determines not to perform early data transmission, that is, not to transmit data in the current random access process; or if the size of the RRC message including the to-be-transmitted data is smaller than or equal to the data amount control threshold corresponding to the coverage level, the data amount corresponding to the coverage level meets the RRC message including the to-be-transmitted data, that is, the MAC entity determines to perform early data transmission, that is, to transmit data in the current random access process.

Step 3: If a determining result of the MAC entity is that the data amount corresponding to the coverage level does not meet the RRC message including the to-be-transmitted data, the MAC entity returns indication information to the RRC entity, where the indication information is used to indicate that data is not to be transmitted in the random access process.

Step 4: The MAC entity performs random access based on the conventional RRC message, to be specific, sends a random access preamble, receives a random access response returned by the base station, and sends, on an uplink resource in the random access response, the RRC message that does not include the to-be-transmitted data.

In this solution, the RRC entity does not need to generate an RRC message again after receiving the indication information indicating that data is not to be transmitted in the random access process, and the MAC entity directly performs random access based on the previously received conventional RRC message.

Step 5: If a determining result of the MAC entity is that the data amount corresponding to the coverage level meets the RRC message including the to-be-transmitted data, the MAC entity sends a specific random access preamble to a lower-layer entity, to initiate an early data transmission process.

This solution means that the MAC entity determines the specific random access preamble, and sends the specific random access preamble to the lower-layer entity. The random access preamble indicates that data needs to be transmitted in the current random access process. A specific indication manner is not limited in this application. In this way, when the lower-layer entity interacts with the base station, the base station can determine, by using the random access preamble, that data needs to be transmitted in the current random access, and allocates a resource to the communications device. The MAC entity receives, from the lower-layer entity, the random access response RAR returned by the base station, where the RAR carries the uplink resource. The MAC entity sends, on the uplink resource, the RRC message including the to-be-transmitted data, or selects, from uplink resources allocated by the base station, a proper resource to upload all or some RRC messages including the to-be-transmitted data. That is, the MAC entity sends the RRC message including the to-be-transmitted data in the message 3 shown in FIG. 1.

After step 5, optionally, the MAC entity may further perform determining again based on the resource carried in the RAR, to determine whether the to-be-transmitted data can be transmitted in the random access process. A specific process is shown in the following steps 6 and 7.

Step 6: If the resource is relatively small, the MAC entity sends indication information to the RRC entity, to indicate that data cannot be transmitted in the random access process.

A meaning of the indication information in this step is similar to that of the indication information in step 7 in Embodiment 1. Details are not described herein again.

In this solution, when the MAC entity sends the RRC message including the to-be-transmitted data, and finds that the configured uplink resource is insufficient to transmit the RRC message including the to-be-transmitted data, the MAC entity only needs to indicate that data cannot be transmitted in the random access process, and does not need to indicate to the RRC entity that the conventional RRC message needs to be generated.

Step 7: The MAC entity sends, on the uplink resource in the random access response based on the previously received conventional RRC message, the conventional RRC message that does not include the to-be-transmitted data. That is, the MAC entity sends the conventional RRC message in the message 3 shown in FIG. 1.

The random access method of a communications apparatus provided in this embodiment provides a solution for interaction between the MAC entity and the RRC entity in the random access process. The MAC entity determines, based on the data amount control threshold and a size of the resource, which one of the two RRC messages is to be transmitted, and does not need to generate an RRC message in the random access process, so that flexible switching may be performed between an early data transmission procedure and a conventional random access procedure. In addition, the early data transmission procedure can be seamlessly rolled back to the conventional random access procedure, the random access preamble does not need to be resent, and the random access response does not need to be received again, thereby reducing signaling overheads, and helping reduce power consumption of the communications apparatus and a transmission latency.

Embodiment 3

Figure 5:
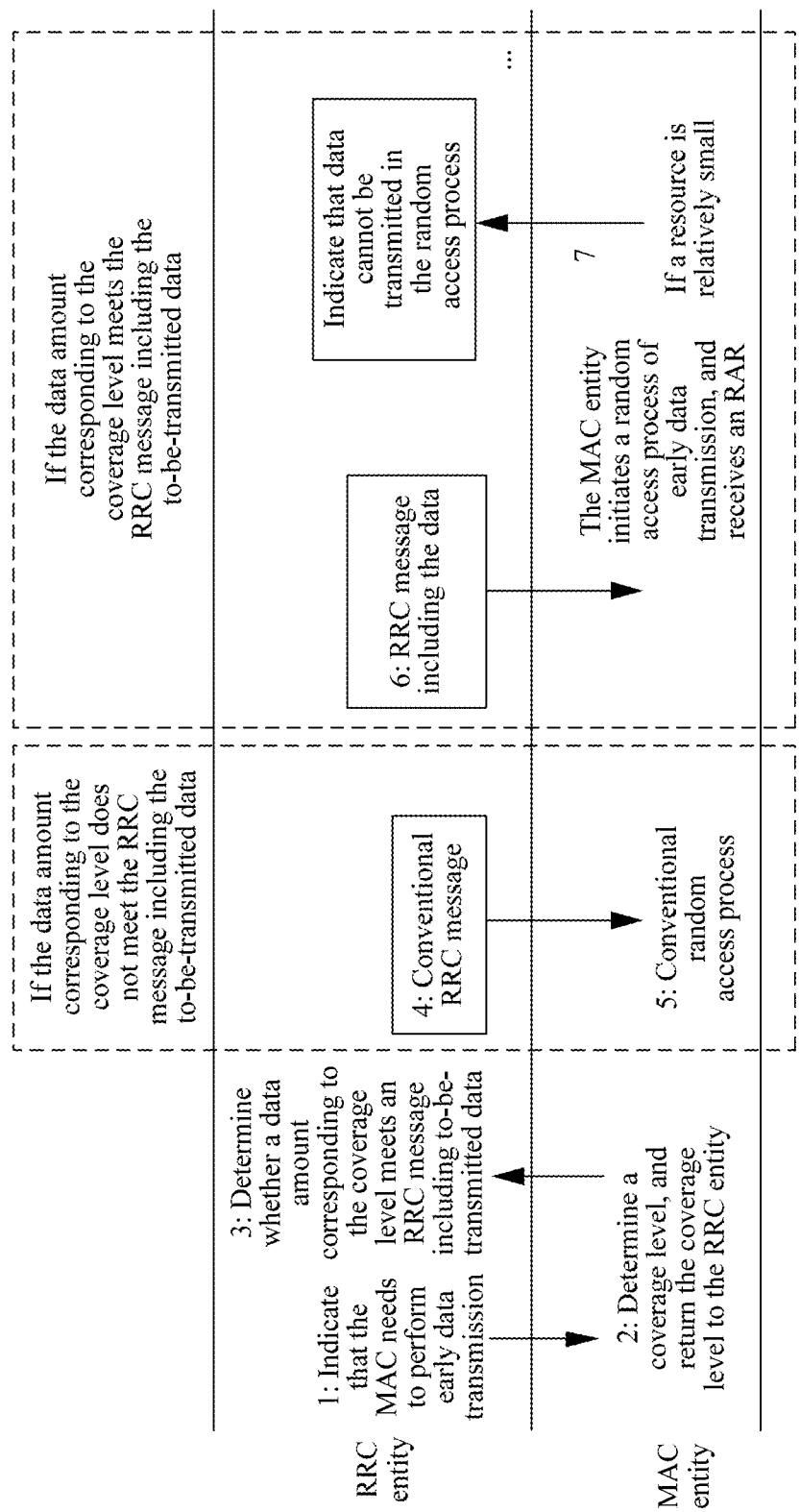
FIG. 5 is a schematic interaction diagram of Embodiment 3 of a random access method of a communications apparatus according to this application.

FIG. 5 is a schematic interaction diagram of Embodiment 3 of a random access method of a communications apparatus according to this application. As shown in FIG. 5, in this solution, whether to initiate conventional random access or EDT in an initial phase is determined by an RRC entity. A specific interaction process of the method is as follows:

Step 1: The RRC entity sends indication information to a MAC entity, to indicate that data needs to be transmitted in a random access process.

In this solution, a meaning of the indication information is different from that of the indication information in the foregoing solution. Herein, a purpose of sending the indication information to the MAC entity by the RRC entity is to obtain a coverage level. Therefore, in addition to indicating that to-be-transmitted data is to be transmitted in the random access process, the indication information may be further used to indicate that the coverage level is to be obtained, or the indication information may be further used to instruct the MAC entity to return the coverage level to the RRC entity. This is not limited in this application.

Step 2: After the MAC entity receives the indication information, the MAC entity determines the coverage level of the communications apparatus based on an RSRP obtained through measurement, and the MAC entity sends the coverage level to the RRC entity.

Step 3: The RRC entity determines, based on the received coverage level, whether a data amount corresponding to the coverage level meets an RRC message including to-be-transmitted data.

A specific meaning of this step is: The RRC entity determines, based on a data amount control threshold, preconfigured by a base station, corresponding to the coverage level, whether the data amount corresponding to the coverage level of the communications apparatus is sufficient to transmit the RRC message including the to-be-transmitted data. To be specific, the RRC entity determines whether a size of the RRC message including the to-be-transmitted data is greater than the data amount control threshold corresponding to the coverage level. If the size of the RRC message including the to-be-transmitted data is greater than the data amount control threshold corresponding to the coverage level, the data amount corresponding to the coverage level does not meet the RRC message including the to-be-transmitted data, that is, the RRC entity determines not to perform early data transmission, that is, not to transmit data in the current random access process; or if the size of the RRC message including the to-be-transmitted data is smaller than or equal to the data amount control threshold corresponding to the coverage level, the data amount corresponding to the coverage level meets the RRC message including the to-be-transmitted data, that is, the RRC entity determines to perform early data transmission, that is, to transmit data in the current random access process. In addition, the RRC entity obtains the coverage level from the MAC entity, determines whether to perform data transmission in the random access process, and may generate a corresponding RRC message based on a determining result, to avoid a problem that an RRC message that does not meet the data amount supported by the coverage level is generated and an RRC message needs to be generated again in a subsequent process, thereby improving transmission efficiency.

Step 4: If a determining result of the RRC entity is that the data amount corresponding to the coverage level does not meet the RRC message including the to-be-transmitted data, the RRC entity sends a conventional RRC message to the MAC entity.

Step 5: The MAC entity performs random access based on the conventional RRC message, to be specific, sends a random access preamble, receives a random access response returned by the base station, and sends, on an uplink resource in the random access response, the RRC message that does not include the to-be-transmitted data.

Step 6: If a determining result of the RRC entity is that the data amount corresponding to the coverage level meets the RRC message including the to-be-transmitted data, the RRC entity sends the RRC message including the to-be-transmitted data to the MAC entity.

Step 7: The MAC entity receives the RRC message including the to-be-transmitted data, and initiates an early data transmission process.

The MAC entity determines a specific random access preamble, and sends the specific random access preamble to a lower-layer entity. The random access preamble indicates that data needs to be transmitted in the current random access process. A specific indication manner is not limited in this application. In this way, when the lower-layer entity interacts with the base station, the base station can determine, by using the random access preamble, that data needs to be transmitted in the current random access, and allocates a resource to the communications device. The MAC entity receives, from the lower-layer entity, the random access response RAR returned by the base station, where the RAR carries the uplink resource. The MAC entity sends, on the uplink resource, the RRC message including the to-be-transmitted data, or selects, from uplink resources allocated by the base station, a proper resource to upload all or some RRC messages including the to-be-transmitted data. That is, the MAC entity sends the RRC message including the to-be-transmitted data in the message 3 shown in FIG. 1.

Similar to Embodiment 1 and Embodiment 2, optionally, in specific implementation of step 7, the MAC entity may transmit, based on the resource allocated by the base station, the RRC message including the to-be-transmitted data. The MAC entity may further perform determining again based on the resource carried in the RAR, to determine whether the to-be-transmitted data can be transmitted in the random access process. A specific process is similar to those in Embodiment 1 and Embodiment 2. If the resource is relatively small, the MAC entity sends an indication to the RRC entity, to indicate that data cannot be transmitted in the random access process, to be specific, to indicate that the configured uplink resource is relatively small and is insufficient to transmit the RRC message including the to-be-transmitted data. When the MAC entity sends the RRC message including the to-be-transmitted data, and finds that the configured uplink resource is insufficient to transmit the RRC message including the to-be-transmitted data, the MAC entity needs to indicate to the RRC entity that the conventional RRC message needs to be sent. After receiving the indication information indicating that data cannot be transmitted in the random access process, the RRC entity generates the conventional RRC message that does not include the to-be-transmitted data, and sends the conventional RRC message to the MAC entity. The MAC entity receives the conventional RRC message, and sends, on the uplink resource in the random access response, the conventional RRC message that does not include the to-be-transmitted data. That is, the MAC entity sends the conventional RRC message in the message 3 shown in FIG. 1.

The random access method of a communications apparatus provided in this embodiment provides a solution for interaction between the MAC entity and the RRC entity in the random access process. Different from the foregoing two solutions, in this solution, the RRC entity determines whether to perform early data transmission, and an RRC layer makes a decision after learning of the coverage level of the communications apparatus, and determines, based on a decision result, whether the RRC message sent to the MAC entity includes the to-be-transmitted data, so that flexible switching may be performed between an early data transmission procedure and a conventional random access procedure. In addition, the early data transmission procedure can be seamlessly rolled back to the conventional random access procedure, the random access preamble does not need to be resent, and the random access response does not need to be received again, thereby reducing signaling overheads, and helping reduce power consumption of the communications apparatus and a transmission latency.

In the foregoing several embodiments, the RRC entity adds the to-be-transmitted data to the RRC message and transmits the RRC message to the MAC entity, and then transmits, in the random access process, the RRC message carrying the data. In an actual application process of the solution, when the to-be-transmitted data is at a MAC layer, whether to transmit the data in the random access process may still be determined by the MAC entity or the RRC entity, and after the MAC entity determines to transmit the data in the random access process, the MAC entity may add, after receiving the RRC message transferred by the RRC entity, the to-be-transmitted data to the RRC message for transmission. Which entity adds the to-be-transmitted data to the RRC message is not limited in this application.

It can be learned from the foregoing several embodiments that, in the random access method of a communications apparatus provided in this application, whether non-signaling data such as service data is to be transmitted in the random access process may be determined by the MAC entity, or may be determined by the RRC entity. It can be learned from the foregoing embodiments that the random access method includes at least the following specific implementation solutions:

In a specific implementation solution, the MAC entity of the communications apparatus receives a first RRC message from an upper-layer entity, where the first RRC message includes to-be-transmitted data; the MAC entity determines a first random access preamble if a data amount supported by a coverage level of the communications apparatus meets a size of the first RRC message, where the first random access preamble is used to indicate that the first RRC message is to be sent in a random access process.

In this solution, for a specific implementation, refer to step 1 and steps 6 to 9 in Embodiment 1 and Embodiment 2.

The upper-layer entity may be the RRC entity, and the first RRC message is sent by the RRC entity to the MAC entity. That is, the RRC entity sends the first RRC message to a lower-layer entity, where the first RRC message includes the to-be-transmitted data. In other words, the first random access preamble may be used to notify a receive end that data other than signaling is to be transmitted in the current random access process. It may be understood that a function of the first random access preamble may be expressed in a plurality of manners. For example, the first random access preamble may be used to indicate that the RRC message carrying the to-be-transmitted data is to be sent in the random access process. For another example, the first random access preamble may be used to indicate that the to-be-transmitted data is to be sent in the random access process. For another example, the first random access preamble may be used to indicate that the to-be-transmitted data is to be sent by using the RRC message in the random access process. For another example, the first random access preamble may be used to indicate that the to-be-transmitted data is to be sent in MSG3 in the random access process. For another example, the first random access preamble may be used to indicate that the to-be-transmitted data is to be sent by using a message in the random access process. An expression manner of the function of the first random access preamble is not limited in this application.

In addition, the first random access preamble and an existing random access preamble may use different resources, so that the receive end can distinguish between the first random access preamble and the existing random access preamble by using the resources used by the preambles. A resource dimension includes a time domain (a period, duration, a start time, and the like of a resource for sending a preamble), a frequency domain (a carrier, a subcarrier, and the like used to send a preamble), a code domain (a code word used by a preamble), and the like. A difference between resources may be a difference in any one or more of a time domain, a frequency domain, and a code domain. This is not limited in this application. The MAC entity may obtain, in a plurality of manners, resources that can be used by the first random access preamble and the existing random access preamble, for example, obtain a related configuration from the upper-layer entity. This is also not limited.

Optionally, based on the foregoing solution, this solution further includes:

receiving, by the MAC entity from a lower-layer entity, a response message that is in response to the first random access preamble, where the response message includes a resource allocated to the communications apparatus; and sending, by the MAC entity, the first RRC message to the lower-layer entity if the resource meets a size of the first RRC message. For specific implementation of this solution, refer to the specific implementation in step 6 in the foregoing Embodiment 1.

Optionally, based on any one of the foregoing solutions, this solution further includes:

sending, by the MAC entity, first indication information to the upper-layer entity if the data amount supported by the coverage level of the communications apparatus does not meet the size of the first RRC message, where the first indication information is used to indicate that the first RRC message cannot be sent in the random access process. In this solution, when the RRC entity is the upper-layer entity, the RRC entity receives the first indication information sent by the lower-layer entity, where the first indication information is used to indicate that the first RRC message cannot be sent in the random access process. For specific implementation of this solution, refer to the specific implementation in steps 3 to 5 in the foregoing Embodiment 1.

Optionally, based on any one of the foregoing solutions, this solution further includes:

sending, by the MAC entity, second indication information to the upper-layer entity if the resource does not meet the size of the first RRC message, where the second indication information is used to indicate that the first RRC message cannot be sent in the random access process.

The RRC entity receives the second indication information sent by the lower-layer entity, where the second indication information is used to indicate that the first RRC message cannot be sent in the random access process.

In conclusion, when the data amount supported by the coverage level of the communications apparatus does not meet the size of the first RRC message; or the resource allocated to the communications apparatus does not meet the size of the first RRC message, the RRC entity may receive the indication information used to indicate that the first RRC message cannot be sent in the random access process. For details, refer to explanations of the first indication information and the second indication information in Embodiment 1.

Based on any one of the foregoing solutions, this solution further includes:

sending, by the RRC entity, a second RRC message to the lower-layer entity. The second RRC message does not include the to-be-sent data.

The MAC entity receives the second RRC message from the upper-layer entity, where the second RRC message does not include the to-be-sent data. The second RRC message is the conventional RRC message in the foregoing solutions, and may be received together with the first RRC message at the beginning (referring to step 1 in Embodiment 2), or may be received after the second indication information is sent to the upper-layer entity (referring to step 4 in Embodiment 1).

The MAC entity sends the second RRC message to the lower-layer entity if the data amount supported by the coverage level of the communications apparatus does not meet the size of the first RRC message; or the MAC entity sends the second RRC message to the lower-layer entity if the resource does not meet the size of the first RRC message.

In this solution, it should be understood that, that the data amount supported by the coverage level does not meet the size of the first RRC message means that the size of the first RRC message exceeds a data amount control threshold supported by the coverage level. That the resource does not meet the size of the first RRC message means that an uplink resource configured by the base station is insufficient to transmit the first RRC message.

In the foregoing several implementations, whether non-signaling data such as service data is to be transmitted in the random access process is determined by the MAC entity of the communications apparatus. In addition, it should be understood that the MAC entity needs to determine whether the data amount supported by the coverage level of the communications apparatus meets the size of the first RRC message. When the size of the first RRC message is less than or equal to the data amount supported by the coverage level, the data amount supported by the coverage level meets the size of the first RRC message; or when the size of the first RRC message is greater than the data amount supported by the coverage level, the data amount supported by the coverage level does not meet the size of the first RRC message.

The MAC entity may obtain, in a plurality of manners, the data amount supported by the coverage level of the communications apparatus. For example, the MAC entity may obtain configuration information of the communications apparatus or configuration information of a network from the upper-layer entity. This is not limited in this solution.

A main purpose of the first indication information is to notify the RRC entity that a determining result of the MAC entity is that data cannot be transmitted in the random access process. It may be understood that a function of the first indication information may be expressed in a plurality of manners. For example, the first indication information may be used to indicate that the first RRC message cannot be sent in the random access process. For another example, the first indication information may be used to indicate that a data amount supported by the current coverage level does not meet the size of the first RRC message. For another example, the first indication information may be used to indicate that the first RRC message cannot be transmitted. For another example, the first indication information may be used to indicate that an RRC message that does not include data is needed. For another example, the first indication information may be used to indicate that an early data transmission procedure is not to be performed in the current random access process, or that data cannot be transmitted in the current random access process. This is not limited in this application. Similarly, a purpose of the second indication information is also to indicate that the resource is found insufficient to transmit the first RRC message in a transmission process. It may be understood that a function of the second indication information may be expressed in a plurality of manners. For example, the second indication information may be used to indicate that an uplink resource is insufficient to transmit the first RRC message. For another example, the second indication information may be used to indicate that a second RRC message that does not include the to-be-transmitted data is to be obtained. For another example, the second indication information may be used to indicate that the first RRC message fails to be transmitted. For another example, the second indication information may be used to indicate that data cannot be transmitted in the current random access process. This is not limited in this application.

In another possible implementation, the MAC entity of the communications apparatus receives first indication information from the upper-layer entity, where the first indication information is used to indicate that to-be-transmitted data is to be transmitted in the random access process (referring to step 1 in Embodiment 3).

The MAC entity returns a coverage level of the communications apparatus to the upper-layer entity (referring to step 2 in Embodiment 3).

In this solution, when the upper-layer entity is the RRC entity, the RRC entity sends the first indication information to a lower-layer entity, where the first indication information is used to indicate that the to-be-transmitted data is to be transmitted in the random access process; the RRC entity receives the coverage level, of the communications apparatus, returned by the lower-layer entity; and the RRC entity sends a first RRC message to the lower-layer entity if a data amount supported by the coverage level of the communications apparatus meets a size of the first RRC message, where the first RRC message includes the to-be-transmitted data.

A meaning of the first indication information is different from that of the first indication information in the foregoing solution. Herein, a purpose of sending the first indication information to the MAC entity by the RRC entity is to obtain the coverage level. Therefore, in addition to indicating that the to-be-transmitted data is to be transmitted in the random access process, the first indication information may be further used to indicate that the coverage level is to be obtained, or instruct the MAC entity to return the coverage level to the RRC entity. This is not limited in this application.

Optionally, based on the foregoing solution, the RRC entity sends the first RRC message to the lower-layer entity if the data amount supported by the coverage level of the communications apparatus meets the size of the first RRC message, where the first RRC message includes the to-be-transmitted data.

The MAC entity receives the first RRC message from the upper-layer entity, where the first RRC message includes the to-be-transmitted data; and the MAC entity determines a first random access preamble, where the first random access preamble is used to indicate that the first RRC message is to be sent in the random access process.

Optionally, based on the foregoing solution, the method further includes:

receiving, by the MAC entity from the lower-layer entity, a response message that is in response to the first random access preamble, where the response message includes a resource allocated to the communications apparatus; and sending, by the MAC entity, the first RRC message to the lower-layer entity if the resource meets the size of the first RRC message. For implementation of the foregoing solution, refer to steps 3 and 6 in Embodiment 3.

Optionally, based on the foregoing solution, the method further includes:

sending, by the MAC entity, second indication information to the upper-layer entity if the resource does not meet the size of the first RRC message, where the second indication information is used to indicate that the first RRC message cannot be sent in the random access process. For implementation of this solution, refer to step 7 in Embodiment 3.

In this solution, when the upper-layer entity is the RRC entity, the RRC entity receives the second indication information sent by the lower-layer entity, where the second indication information is used to indicate that the first RRC message cannot be sent in the random access process; and the RRC entity sends a second RRC message to the lower-layer entity, where the second RRC message does not include the to-be-sent data. For specific implementation of this solution, refer to steps 4 and 5 in Embodiment 3.

Optionally, based on the foregoing solution, the RRC entity sends the second RRC message to the lower-layer entity if the data amount supported by the coverage level of the communications apparatus does not meet the size of the first RRC message, where the second RRC message does not include the to-be-sent data.

The MAC entity receives the second RRC message from the upper-layer entity, where the second RRC message does not include the to-be-sent data; and the MAC entity sends the second RRC message to the lower-layer entity.

In the foregoing solution, whether non-signaling data such as service data is to be transmitted in the random access process is determined by the RRC entity of the communications apparatus. A meaning of the second indication information in this solution is the same as that of the second indication information in the foregoing solution. Details are not described herein again.

In the foregoing solution, it should be further understood that the upper-layer entity includes an entity that is located at a layer higher than that of a current entity and that is adjacent to or not adjacent to the current entity. For example, another function entity may be further included between the RRC entity and the MAC entity.

The random access method of a communications apparatus provided in this application provides a solution for interaction between the MAC entity and the RRC entity in the random access process, so that flexible switching may be performed between an early data transmission procedure and a conventional random access procedure. In addition, the early data transmission procedure can be seamlessly rolled back to the conventional random access procedure, the random access preamble does not need to be resent, and the random access response does not need to be received again, thereby reducing signaling overheads, and helping reduce power consumption of the communications apparatus and a transmission latency.

Figure 6:
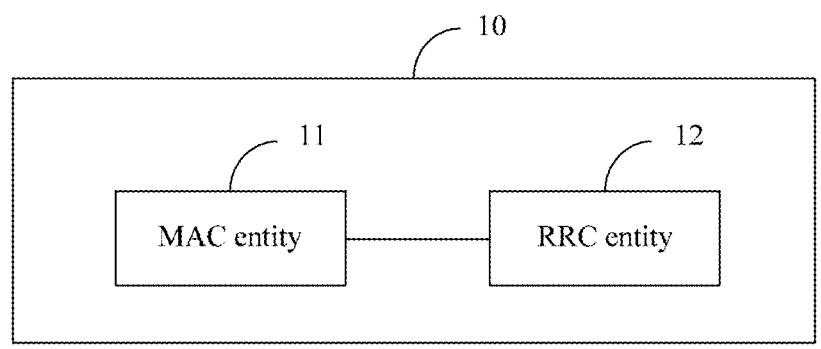
FIG. 6 is a schematic structural diagram of Embodiment 1 of a communications apparatus according to this application.

FIG. 6 is a schematic structural diagram of Embodiment 1 of a communications apparatus according to this application. As shown in FIG. 6, the communications apparatus 10 includes a MAC entity 11 and an RRC entity 12. In specific implementation of the communications apparatus, the MAC entity 11 and the RRC entity 12 may be disposed in a same apparatus, or may be disposed in a distributed manner in different apparatuses. This is not limited in this application.

The MAC entity 11 is configured to:

receive a first RRC message from an upper-layer entity, where the first RRC message includes to-be-transmitted data; and determine a first random access preamble if a data amount supported by a coverage level of the communications apparatus meets a size of the first RRC message, where the first random access preamble is used to indicate that the first RRC message is to be sent in a random access process.

Optionally, the MAC entity 11 is further configured to:

receive, from a lower-layer entity, a response message that is in response to the first random access preamble, where the response message includes a resource allocated to the communications apparatus; and send the first RRC message to the lower-layer entity if the resource meets the size of the first RRC message.

Optionally, the MAC entity 11 is further configured to:

send first indication information to the upper-layer entity if the data amount supported by the coverage level of the communications apparatus does not meet the size of the first RRC message, where the first indication information is used to indicate that the first RRC message cannot be sent in the random access process.

Optionally, the MAC entity 11 is further configured to:

send second indication information to the upper-layer entity if the resource does not meet the size of the first RRC message, where the second indication information is used to indicate that the first RRC message cannot be sent in the random access process.

Optionally, the MAC entity 11 is further configured to:

receive a second RRC message from the upper-layer entity, where the second RRC message does not include the to-be-sent data; and send the second RRC message to the lower-layer entity if the data amount supported by the coverage level of the communications apparatus does not meet the size of the first RRC message; or send the second RRC message to the lower-layer entity if the resource does not meet the size of the first RRC message.

Optionally, the RRC entity 12 is configured to:

send the first RRC message to a lower-layer entity, where the first RRC message includes the to-be-transmitted data.

Optionally, the RRC entity 12 is further configured to:

receive indication information sent by the lower-layer entity, where the indication information is used to indicate that the first RRC message cannot be sent in the random access process.

Optionally, the data amount supported by the coverage level of the communications apparatus does not meet the size of the first RRC message; or the resource allocated to the communications apparatus does not meet the size of the first RRC message.

Optionally, the RRC entity 12 is further configured to:

send the second RRC message to the lower-layer entity, where the second RRC message does not include the to-be-sent data.

The communications apparatus provided in any implementation above is configured to implement the random access methods of a communications apparatus provided in the foregoing method embodiments. Their implementation principles and technical effects are similar. Details are not described herein again.

In another implementation solution of the communications apparatus 10, the MAC entity 11 is configured to:

receive first indication information from an upper-layer entity, where the first indication information is used to indicate that to-be-transmitted data is to be transmitted in a random access process; and return a coverage level of the communications apparatus to the upper-layer entity.

Optionally, the MAC entity 11 is further configured to:

receive a first RRC message from the upper-layer entity, where the first RRC message includes the to-be-transmitted data; and determine a first random access preamble, where the first random access preamble is used to indicate that the first RRC message is to be sent in the random access process.

Optionally, the MAC entity 11 is further configured to:

receive, from a lower-layer entity, a response message that is in response to the first random access preamble, where the response message includes a resource allocated to the communications apparatus; and send the first RRC message to the lower-layer entity if the resource meets a size of the first RRC message.

Optionally, the MAC entity 11 is further configured to:

send second indication information to the upper-layer entity if the resource does not meet the size of the first RRC message, where the second indication information is used to indicate that the first RRC message cannot be sent in the random access process.

Optionally, the MAC entity 11 is further configured to:

receive a second RRC message from the upper-layer entity, where the second RRC message does not include the to-be-sent data; and send the second RRC message to the lower-layer entity.

Optionally, the RRC entity 12 is configured to:

send the first indication information to a lower-layer entity, where the first indication information is used to indicate that the to-be-transmitted data is to be transmitted in a random access process;

receive the coverage level, of the communications apparatus, returned by the lower-layer entity; and send the first RRC message to the lower-layer entity if the data amount supported by the coverage level of the communications apparatus meets the size of the first RRC message, where the first RRC message includes the to-be-transmitted data.

Optionally, the RRC entity 12 is further configured to:

receive the second indication information sent by the lower-layer entity, where the second indication information is used to indicate that the first RRC message cannot be sent in the random access process; and send the second RRC message to the lower-layer entity, where the second RRC message does not include the to-be-sent data.

Optionally, the RRC entity 12 is further configured to:

send the second RRC message to the lower-layer entity if the data amount supported by the coverage level of the communications apparatus does not meet the size of the first RRC message, where the second RRC message does not include the to-be-sent data.

The communications apparatus provided in any implementation above is configured to implement the random access methods of a communications apparatus provided in the foregoing method embodiments. Their implementation principles and technical effects are similar. Details are not described herein again.

Figure 7:
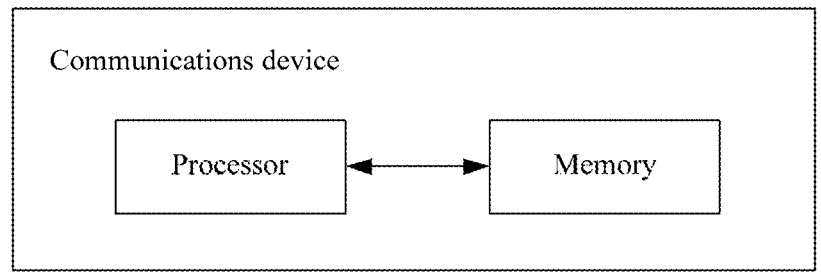
FIG. 7 is a schematic structural diagram of Embodiment 1 of a communications device according to this application.

FIG. 7 is a schematic structural diagram of Embodiment 1 of a communications device according to this application. As shown in FIG. 7, the communications device includes a memory configured to store a computer instruction and a processor. The processor is configured to:

receive a first RRC message from an upper-layer entity, where the first RRC message includes to-be-transmitted data; and determine a first random access preamble if a data amount supported by a coverage level of the communications apparatus meets a size of the first RRC message, where the first random access preamble is used to indicate that the first RRC message is to be sent in a random access process.

Optionally, the processor is further configured to:

receive, from a lower-layer entity, a response message that is in response to the first random access preamble, where the response message includes a resource allocated to the communications apparatus; and send the first RRC message to the lower-layer entity if the resource meets the size of the first RRC message.

Optionally, the processor is further configured to:

send first indication information to the upper-layer entity if the data amount supported by the coverage level of the communications apparatus does not meet the size of the first RRC message, where the first indication information is used to indicate that the first RRC message cannot be sent in the random access process.

Optionally, the processor is further configured to:

send second indication information to the upper-layer entity if the resource does not meet the size of the first RRC message, where the second indication information is used to indicate that the first RRC message cannot be sent in the random access process.

Optionally, the processor is further configured to:

receive a second RRC message from the upper-layer entity, where the second RRC message does not include the to-be-sent data; and send the second RRC message to the lower-layer entity if the data amount supported by the coverage level of the communications apparatus does not meet the size of the first RRC message; or send the second RRC message to the lower-layer entity if the resource does not meet the size of the first RRC message.

Optionally, the processor is configured to:

send the first RRC message to the lower-layer entity, where the first RRC message includes the to-be-transmitted data.

Optionally, the processor is further configured to:

receive the first indication information sent by the upper-layer entity, where the first indication information is used to indicate that the first RRC message cannot be sent in the random access process.

Optionally, the processor is further configured to:

receive the second indication information sent by the upper-layer entity, where the second indication information is used to indicate that the first RRC message cannot be sent in the random access process.

Optionally, the processor is further configured to:

send the second RRC message to the lower-layer entity, where the second RRC message does not include the to-be-sent data.

In another type of specific implementation of the communications device, the processor is configured to:

receive first indication information from an upper-layer entity, where the first indication information is used to indicate that to-be-transmitted data is to be transmitted in a random access process; and return a coverage level of the communications apparatus to the upper-layer entity.

Optionally, the processor is further configured to:

receive a first RRC message from the upper-layer entity, where the first RRC message includes the to-be-transmitted data; and determine a first random access preamble, where the first random access preamble is used to indicate that the first RRC message is to be sent in the random access process.

Optionally, the processor is further configured to:

receive, from a lower-layer entity, a response message that is in response to the first random access preamble, where the response message includes a resource allocated to the communications apparatus; and send the first RRC message to the lower-layer entity if the resource meets a size of the first RRC message.

Optionally, the processor is further configured to:

send second indication information to the upper-layer entity if the resource does not meet the size of the first RRC message, where the second indication information is used to indicate that the first RRC message cannot be sent in the random access process.

Optionally, the processor is further configured to:

receive a second RRC message from the upper-layer entity, where the second RRC message does not include the to-be-sent data; and send the second RRC message to the lower-layer entity.

Optionally, the processor is configured to:

send the first indication information to the lower-layer entity, where the first indication information is used to indicate that the to-be-transmitted data is to be transmitted in the random access process;

receive the coverage level, of the communications apparatus, returned by the lower-layer entity; and send the first RRC message to the lower-layer entity if the data amount supported by the coverage level of the communications apparatus meets the size of the first RRC message, where the first RRC message includes the to-be-transmitted data.

Optionally, the processor is further configured to:

receive the second indication information sent by the lower-layer entity, where the second indication information is used to indicate that the first RRC message cannot be sent in the random access process; and send the second RRC message to the lower-layer entity, where the second RRC message does not include the to-be-sent data.

Optionally, the processor is further configured to:

send the second RRC message to the lower-layer entity if the data amount supported by the coverage level of the communications apparatus does not meet the size of the first RRC message, where the second RRC message does not include the to-be-sent data.

In any implementation of the communications device, there is at least one processor, configured to execute an executable instruction, namely, a computer program, stored in the memory. The communications device may further include a transceiver configured to receive and send data. Optionally, the memory may be further integrated in the processor.

This application further provides a readable storage medium including computer instructions, where the computer instructions are used to implement the random access method of a communications apparatus provided in any foregoing implementation solution.

This application further provides a readable storage medium including computer instructions, where the computer instructions are used to implement the random access method of a communications apparatus provided in any foregoing implementation solution.

This application further provides a program product, where the program product comprises computer instructions, the computer instructions are stored in a readable storage medium, and at least one processor of a communications device reads the computer instruction from the readable storage medium and executes the computer instruction, to enable the communications device to perform the random access method of a communications apparatus provided in any foregoing implementation.

It should be further understood that in the foregoing embodiment of the communications device, the processor may be a central processing unit (CPU for short), or may be another general-purpose processor, a digital signal processor (DSP for short), an application-specific integrated circuit (ASIC for short), or the like. The general purpose processor may be a microprocessor, or the processor may be any conventional processor or the like. The steps of the method disclosed with reference to the embodiments of this application may be directly performed by a hardware processor, or may be performed by a combination of hardware in the processor and a software module.

Persons of ordinary skill in the art may understand that all or some of the steps of the method embodiments may be implemented by a program instructing relevant hardware. The program may be stored in a computer-readable memory. When the program is executed, the steps of the methods in the embodiments are performed. The memory (storage medium) includes: a read-only memory (ROM for short), a RAM, a flash memory, a hard disk, a solid state disk, a magnetic tape, a floppy disk, an optical disc, and any combination thereof.

Finally, it should be noted that the foregoing embodiments are merely intended for describing the technical solutions of this application, rather than limiting this application.

What is claimed is:

1. A method, comprising:

receiving, at a media access control (MAC) layer from a radio resource control (RRC) layer in a communication apparatus, a first RRC message including to-be-transmitted data;

determining, at the MAC layer in the communication apparatus, a coverage level of the communication apparatus;

determining, at the MAC layer in the communication apparatus, a data amount control threshold corresponding to the coverage level;

determining, at the MAC layer in the communication apparatus and according to the data amount control threshold, that a data amount supported by the coverage level does not meet the size of the first RRC message; and in response to determining that the data amount supported by the coverage level does not meet the size of the first RRC message, sending, from the MAC layer to the RRC layer, indication information, wherein the indication information indicates that an early data transmission (EDT) on the to-be-transmitted data is cancelled.

2. The method according to claim 1, further comprising: generating, at the RRC layer, the first RRC message including the to-be-transmitted data.

3. The method according to claim 2, further comprising: generating, at the RRC layer, a second RRC message, wherein the second RRC message does not comprise the to-be-transmitted data.

4. The method according to claim 1, wherein the indication information indicates that an EDT on the to-be-transmitted data is cancelled, comprising:
the indication information indicates one of the following: the first RRC message including the to-be-transmitted data cannot be sent in a random access process, the data amount threshold corresponding to the coverage level of the communications apparatus does not meet the size of the first RRC message, the first RRC message including the to-be-transmitted data cannot be transmitted, a second RRC message that does not include data is needed, the EDT is not to be performed in a random access process, or data cannot be transmitted in a random access process.

5. The method according to claim 1, wherein the method further comprises:
receiving, at the MAC entity, a second RRC message from the RRC entity, wherein the second RRC message does not include the to-be-transmitted data;
sending, at the MAC entity according to the second RRC message, a random access preamble to the base station; and
receiving, at the MAC entity, a random access response from the base station.

6. The method according to claim 1, wherein the determining a coverage level comprises:
determining, at the MAC entity, the coverage level of the communications apparatus according to a measured Reference Signal Received Power (RSRP).

7. The method according to claim 1, wherein the data amount supported by the coverage level not meeting the size of the first RRC message comprises: the data amount of the first RRC message being greater than the data amount control threshold that corresponds to the coverage level.

8. A communications apparatus, comprising a processor and a readable storage medium storing executable instructions that when executed by the processor, cause the communications apparatus to:
receive, at a media access control (MAC) layer from a radio resource control (RRC) layer in the communication apparatus, a first radio resource control (RRC) message including to-be-transmitted data;
determine, at the MAC layer, a coverage level of the communication apparatus;
determine, at the MAC layer, a data amount control threshold corresponding to the coverage level;
determine, at the MAC layer, and according to the data amount control threshold, that a data amount supported by the coverage level does not meet the size of the first RRC message and according to the data amount control threshold, that a data amount supported by the coverage level does not meet the size of the first RRC message; and in response to determining that the data amount supported by the coverage level does not meet the size of the first RRC message, send indication information, wherein the indication information indicates that an early data transmission (EDT) on the to-be-transmitted data is cancelled.

9. The apparatus according to claim 8, when the executable instructions executed by the processor, cause the apparatus further to:
generate the first RRC message including the to-be-transmitted data.

10. The apparatus according to claim 9, when the executable instructions executed by the processor, cause the apparatus further to:
generate a second RRC message, wherein the second RRC message does not comprise the to-be-transmitted data.

11. The communications apparatus according to claim 8, wherein the indication information indicates that an EDT on the to-be-transmitted data is cancelled, comprising:
the indication information indicates one of the following: the first RRC message including the to-be-transmitted data cannot be sent in a random access process, the data amount threshold corresponding to the coverage level of the communications apparatus does not meet the size of the first RRC message, the first RRC message including the to-be-transmitted data cannot be transmitted, a second RRC message that does not include data is needed, the EDT is not to be performed in a random access process, or data cannot be transmitted in a random access process.

12. The communications apparatus according to claim 8, wherein the instructions, when executed by the processor, cause the communications apparatus to:
receive, at the MAC entity, a second RRC message from the RRC entity, wherein the second RRC message does not include the to-be-transmitted data;
send, at the MAC entity according to the second RRC message, a random access preamble to the base station; and
receive, at the MAC entity, a random access response from the base station.

13. The communications apparatus according to claim 8, wherein the instructions, when executed by the processor, cause the communications apparatus to:
determine, at the MAC entity, the coverage level of the communications apparatus according to a measured Reference Signal Received Power (RSRP).

14. The communications apparatus according to claim 8, wherein the data amount supported by the coverage level not meeting the size of the first RRC message comprises: the data amount of the first RRC message being greater than the data amount control threshold that corresponds to the coverage level.

15. A non-transitory computer-readable medium storing computer instructions, that when executed by one or more hardware processors, cause a communication apparatus to perform operations comprising:
receiving, at a media access control (MAC) layer from a radio resource control (RRC) layer in the communication apparatus, a first RRC message including to-be-transmitted data;
determining, at the MAC layer in the communication apparatus, a coverage level of the communication apparatus;

determining, at the MAC layer in the communication apparatus, a data amount control threshold corresponding to the coverage level;

determining, at the MAC layer in the communication apparatus and according to the data amount control threshold, that a data amount supported by the coverage level does not meet the size of the first RRC message; and in response to determining that the data amount supported by the coverage level does not meet the size of the first RRC message, sending, from the MAC layer to the RRC layer, indication information, wherein the indication information indicates that an early data transmission (EDT) on the to-be-transmitted data is cancelled.

16. The non-transitory computer-readable medium according to claim 15, when the computer instructions executed by the one or more hardware processors, cause the communication apparatus further to perform operations comprising:

generating, at the RRC layer, the first RRC message including the to-be-transmitted data.

17. The non-transitory computer-readable medium according to claim 16, when the computer instructions executed by the one or more hardware processors, cause the communication apparatus further to perform operations comprising:

generating, at the RRC layer, a second RRC message, wherein the second RRC message does not comprise the to-be-transmitted data.

18. The non-transitory computer-readable medium according to claim 15, wherein the operations further comprise:

receiving, at the MAC entity, a second RRC message from the RRC entity, wherein the second RRC message does not include the to-be-transmitted data;

sending, at the MAC entity according to the second RRC message, a random access preamble to the base station; and receiving, at the MAC entity, a random access response from the base station.

19. The non-transitory computer-readable medium according to claim 15, wherein the operations comprise:

determining, at the MAC entity, the coverage level of the communications apparatus according to a measured Reference Signal Received Power (RSRP).

20. The non-transitory computer-readable medium according to claim 15, wherein the data amount supported by the coverage level not meeting the size of the first RRC message comprises: the data amount of the first RRC message being greater than the data amount control threshold that corresponds to the coverage level.

* * * * *